(No Model.)

J. F. MILLER.
MANUFACTURE OF LANTERN GLOBES, &c.

No. 337,692. Patented Mar. 9, 1886.

Witnesses.
W. T. Corwin
H. L. Gill

Inventor.
John F. Miller
by his attys
Bakewell & Kerr

United States Patent Office.

JOHN F. MILLER, OF MARTIN'S FERRY, OHIO, ASSIGNOR OF ONE-HALF TO ARCHIBALD W. PAULL, OF WHEELING, WEST VIRGINIA.

MANUFACTURE OF LANTERN-GLOBES, &c.

SPECIFICATION forming part of Letters Patent No. 337,692, dated March 9, 1886.

Application filed January 12, 1886. Serial No. 188,295. (No model.)

*To all whom it may concern:*

Be it known that I, JOHN F. MILLER, of Martin's Ferry, in the county of Belmont and State of Ohio, have invented a new and useful Improvement in the Manufacture of Lantern-Globes, Chimneys, &c.; and I do hereby declare the following to be a full, clear, and exact description thereof.

My invention relates to the manufacture of lantern-globes, lamp-chimneys, and similar articles provided with a lens or lenses. Such articles have heretofore been made in various ways. They have been blown in a mold and caused to unite with a previously made and heated lens or lenses placed in suitable cavities in the sides of the mold. The lenses have been attached to the sides of globes and chimneys, and combined chimneys and lenses have been made by pressing in suitable molds.
These various methods have either been attended with considerable expense over the formation of plain globes and chimneys or the product has been liable to excessive breakage. Lamp-chimneys have also been blown in a mold having recesses in the sides, so as to make a lens-shaped projection; but the thickness of the glass constituting the projection being the same as that of the sides of the globe or chimney such projections do not possess the properties of a lens, but rather act as reflectors to throw the light through the opposite side of the article.

By my improvement I obtain the advantage of the cheapness of the blowing process in the production of a globe or chimney with a lens or lenses in its sides.

To enable others skilled in the art to make and use my invention, I will now describe it by reference to the accompanying drawings, in which—

Figure 1:
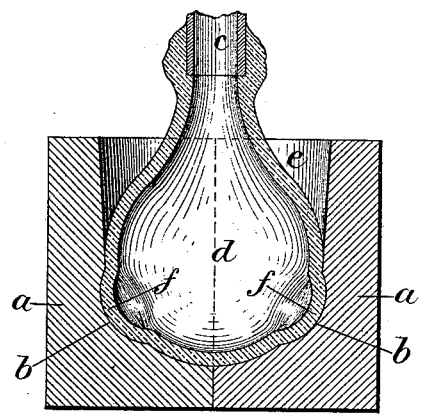
Figure 2:
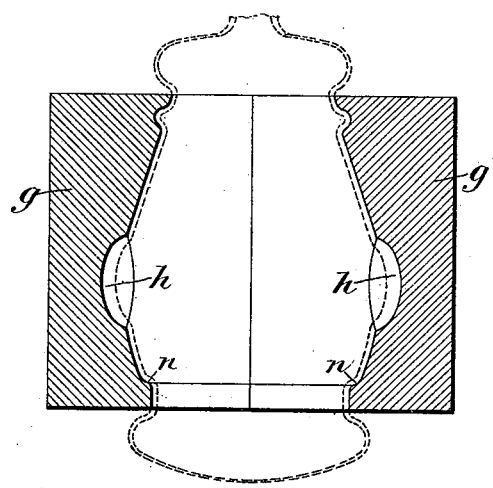
Figure 3:
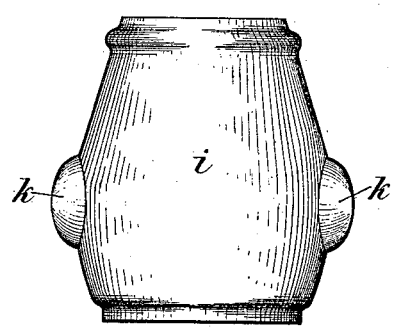
Figure 4:
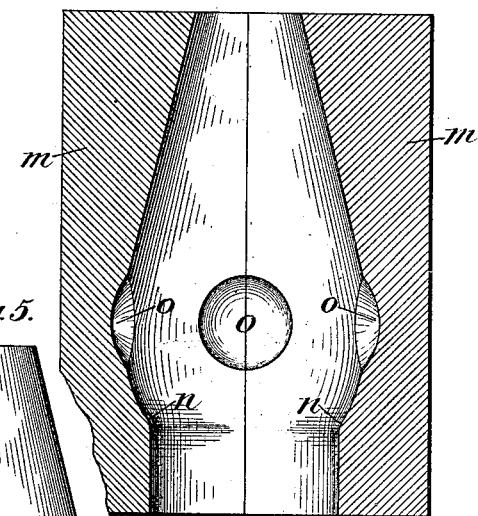
Figure 5:
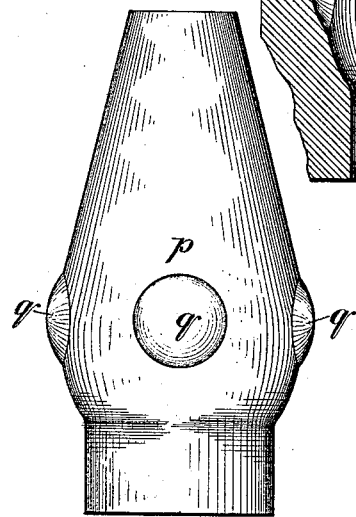

Figure 1 is a view of the mold, and illustrates the first step of my process. Fig. 2 is a sectional view of the globe-mold, illustrating the second step of my improved process. Fig. 3 is a view of a lantern-globe made by my process. Figs. 4 and 5 are views corresponding with Fig. 2 and 3, and illustrate the application of my improved process to the manufacture of lamp-chimneys.

Like letters and figures of reference indicate like parts.

I make use of what I term a "preliminary mold," $a$, having a closed bottom and wide open top, and in the sides of the cavity of such mold I form lens-shaped recesses $b$ at a desired height from the bottom of the cavity. The workman gathers a lump of glass on the end of his blow-pipe $c$, and by blowing forms a bulb, $d$, in the cavity of the mold $b$. The glass is expanded in the cavity $e$ until its external shape corresponds with that of the cavity, having lens-shaped projections $f$, formed by the expansion of the glass into the recesses $b$. As the lump of glass is of considerable size, the thickness of the sides of the bulb $d$ will be comparatively great. The bulb is then taken out of the mold $a$ and placed by the workman inside of the globe-mold $g$, said mold being closed around it in the usual way. The mold $g$ is what is known as "blow-over" mold, and the shape of its cavity is that of the lantern-globe to be produced. The lens-shaped projections $f$ of the bulb $d$ become cooled more rapidly than the rest of the bulb during its transfer from the mold $a$ to the mold $g$. The mold $g$ has lens-shaped cavities $h$, of the size of the lenses to be produced in the finished globe $i$, and the position of these cavities $h$ corresponds with the position of the projections $f$ on the sides of the bulb $d$, so that when the bulb is blown out to the proper size to fill the cavity of the mold $g$ the projections $f$ shall enter the recesses $h$ and receive their final form therefrom. The projections $f$, being, as stated, somewhat cooler and consequently harder than those portions of the bulb $d$, will be less reduced in thickness than the other parts of the bulb in the final blowing operation in the mold $g$, so that the resultant globe $i$ has projecting lenses $k$, of greater thickness than its plain sides, the thickness gradually tapering from the center of the projections $k$ to the edges of the same. Consequently the projections $k$ have the magnifying properties of lenses, and differ in that respect from the projections heretofore formed by blowing on lantern-globes and hereinbefore referred to.

The dotted lines at the upper and lower ends of the mold $g$ indicate the blow-over, which is cut off in the usual way from the globe after it has been blown.

In Figs. 4 and 5 I illustrate the manufacture of lamp-chimneys by the same method. A preliminary bulb, d, of suitable size, having lens projections f, is made, as described, in a suitable mold, a, and, being placed in the chimney-mold m so that its lower end shall rest upon a shoulder, n, is blown out in the manner described to form the chimney p. In this case the projecting lenses q are formed at or below the level of the widest part of the flame of the lamp, so as not to be exposed to the great heat of the flame, which would have a tendency to cause breakage by unduly expanding the thicker glass of the lens.

It is a desirable feature to form the projections f of the preliminary bulb d at a determined distance from the lower end of the bulb, so that the workman, in placing the bulb in position in the second mold, may, by resting it on the shoulder n, expand the projections f directly into the recesses o. This aids in securing certainty in the product and requires less dependence to be had upon the skill of the workman.

This method of making glass globes and chimneys with lenses is extremely cheap, and produces an article less liable to breakage, by reason of unequal expansion and contraction, than the globes and chimneys referred to, where the lenses were separately formed and united to the globe or chimney, by placing such lenses in the recesses in the molds in which said articles are blown.

What I claim as my invention, and desire to secure by Letters Patent, is—

1. The method of making glass lantern-globes, lamp-chimneys, &c., provided with lenses, which consists in first blowing a bulb of glass with a lens or lenses on the sides of the same in a preliminary former or mold, and then transferring said bulb to a chimney or globe mold, and blowing it out into a chimney or globe, substantially as and for the purposes described.

2. The method of making glass globes or lamp-chimneys with lenses, which consists in first blowing a bulb of glass with a lens or lenses on its sides in a preliminary mold at a desired distance from the end, then transferring the bulb to a chimney or globe mold having corresponding lens-cavities, and blowing out the chimney or globe into shape while the lenses are preserved in shape, substantially as and for the purposes described.

In testimony whereof I have hereunto set my hand this 29th day of December, A. D. 1885.

JOHN F. MILLER.

Witnesses:
HARRY W. PAULL,
J. R. PAULL.